United States Patent
Mansour et al.

(10) Patent No.: US 10,382,077 B1
(45) Date of Patent: Aug. 13, 2019

(54) SYSTEMS AND METHODS FOR DYNAMICALLY SELECTING A NUMBER OF TRANSMITTING PORTS IN AN ANTENNA AT AN ACCESS NODE

(71) Applicant: Sprint Spectrum LP, Overland Park, KS (US)

(72) Inventors: Nagi A Mansour, Arlington, VA (US); Kevin Almon Hart, Oakton, VA (US); Akin Ozozlu, McLean, VA (US); Noman Muzaffar Alam, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/907,552

(22) Filed: Feb. 28, 2018

(51) Int. Cl.
*H04B 1/04* (2006.01)

(52) U.S. Cl.
CPC ......... *H04B 1/0483* (2013.01); *H04B 1/0475* (2013.01)

(58) Field of Classification Search
CPC ............................ H04B 1/0483; H04B 1/0475
USPC .......................................................... 455/103
See application file for complete search history.

(56) References Cited

U.S. PATENT DOCUMENTS

| | | | |
|---|---|---|---|
| 4,301,533 A | 11/1981 | Acampora et al. | |
| 5,854,968 A * | 12/1998 | Horwitz | A61K 51/1282 423/2 |
| 7,894,781 B1 | 2/2011 | Clark et al. | |
| 8,761,694 B2 * | 6/2014 | Lorenz | H01Q 3/2605 455/103 |
| 9,318,799 B2 | 4/2016 | Rousu et al. | |
| 2005/0239510 A1* | 10/2005 | Cho | H04B 7/022 455/562.1 |
| 2012/0294266 A1* | 11/2012 | Song | H04B 7/04 370/329 |
| 2018/0069323 A1* | 3/2018 | Tong | H04W 16/28 |

* cited by examiner

*Primary Examiner* — Sonny Trinh (57) ABSTRACT

A system for selecting a number of transmitting ports in an antenna at an access node includes an access node configured to deploy a first radio air interface to provide wireless services to wireless devices. The access node includes an antenna having ports and configured to communicate data with wireless devices through the ports and the first radio air interface. The access node also includes a processor configured to determine a trigger for dynamically selecting a number of transmitting ports in the antenna based on data received from the wireless devices relating to changes in levels of signals received at the wireless devices. The processor is also configured to estimate an amount of change based on the data relating to the changes. The processor is further configured to select a number of transmitting ports in the antenna based on the estimated amount of change.

20 Claims, 5 Drawing Sheets

SYSTEMS AND METHODS FOR DYNAMICALLY SELECTING A NUMBER OF TRANSMITTING PORTS IN AN ANTENNA AT AN ACCESS NODE

TECHNICAL BACKGROUND

A wireless network, such as a cellular network, can include an access node serving a number of end-user wireless devices or user equipment (UE) (hereinafter "wireless devices") in a geographical area covered by the radio frequency transmission of the access node. When the access node transmits data to the end-user wireless devices via an antenna, the signal may be attenuated due to various reasons, such as long distance, severe weather conditions (e.g., rain, snow, heavy cloud, etc.), buildings, trees, or other obstacles in the path of signal transmission. As a result of the signal attenuation, certain data may be lost or otherwise damaged or altered, resulting in poor signal transmission quality. To compensate for the signal attenuation and therefore to improve transmission quality, the access node may implement a transmission diversity scheme, in which two or more transmitting ports of the antenna may be used to transmit the same data or signal. Reliability and quality of signal transmission may be significantly improved using the transmission diversity scheme. The level of transmission diversity may be related to the number of transmitting ports. When more transmitting ports are used, higher levels of transmission diversity may be achieved.

In currently implemented 4G wireless networks, only one two-transmitting-port diversity mode is used, which leads to up to 3 dB gain in signal quality or in the level of signal received at the end-user wireless devices. The two-transmitting-port diversity mode is typically used to enhance performance at cell edge, i.e., at the boundary of a coverage area of the access node. In such a transmission diversity mode, the same data is transmitted by the access node from two antenna elements or ports using different encoding.

In certain circumstances, the signal attenuation may change over time as the environment changes. For example, when the weather changes (e.g., rain, snow, etc.), the signal attenuation may change. When the landscape changes (e.g., number of buildings), the signal attenuation may also change. In some circumstances, the signal attenuation may change as end-user wireless devices move from one place to another. When the wireless devices move from a portion of the coverage area supporting 4G wireless communications (using lower frequencies) to a portion of the coverage area supporting 5G wireless communications (using higher frequencies), the signal attenuation may change. When the signal attenuation changes, levels of signals received at the end-user wireless devices may change. For example, the levels of signals may experience a reduction of greater than 3 dB (e.g., 5 dB, 10 dB, etc.). Moreover, in wireless networks that use high frequency spectrum, such as frequencies higher than 8 GHz, e.g., 28 GHz, 39 GHz (e.g., those of 5G wireless frequencies ranging from about 30 GHz to about 300 GHz), the signals are more susceptible to signal attenuation than wireless networks that operate on low frequency spectrum (e.g., 900 MHz, 2.5 GHz, etc.). Furthermore, with 5G wireless technologies, full dimension multi-input-multi-output (FD MIMO) may be used in antennas. An antenna that supports FD MIMO may use an array of a large number of antenna elements or ports, such as 16×16, 64×64, etc. Therefore, as higher frequencies are used for wireless communication and as a large number of antenna elements are available for transmitting signals, there is a need for systems and methods that are capable of dynamically selecting the number of transmitting ports of an antenna for an access node.

OVERVIEW

Exemplary embodiments described herein include systems, methods, and processing nodes for selecting a number of transmitting ports in an antenna at an access node. An exemplary system described herein for selecting a number of transmitting ports in an antenna at an access node includes an access node configured to deploy a first radio air interface to provide wireless services to a plurality of end-user wireless devices. The access node includes an antenna having a plurality of ports and configured to communicate data with the end-user wireless devices through the ports and the first radio air interface. The access node also includes a processor configured to determine a trigger for dynamically selecting a number of transmitting ports in the antenna based on data received from the end-user wireless devices relating to changes in levels of signals received at the end-user wireless devices. The processor is also configured to estimate an amount of change in the levels of signals based on the data relating to the changes in levels of signals received at the end-user wireless devices. The processor is further configured to select a number of transmitting ports in the antenna based on the estimated amount of change.

An exemplary method described herein for dynamically selecting a number of transmitting ports in an antenna at an access node includes determining a trigger for dynamically selecting a number of transmitting ports in the antenna based on data received from a plurality of end-user wireless devices relating to changes in levels of signals received at the end-user wireless devices. The method also includes estimating an amount of change in the levels of signals based on the data relating to the changes in levels of signals received at the end-user wireless devices. The method further includes selecting a number of transmitting ports in the antenna based on the estimated amount of change.

An exemplary processing node described herein for dynamically selecting a number of transmitting ports in an antenna at an access node. The processing node is configured to perform operations including determining a trigger for dynamically selecting a number of transmitting ports in the antenna based on data received from a plurality of end-user wireless devices relating to changes in levels of signals received at the end-user wireless devices. The operations also include estimating an amount of change in the levels of signals based on the data relating to the changes in levels of signals received at the end-user wireless devices. The operations further include selecting a number of transmitting ports in the antenna based on the estimated amount of change.

DETAILED DESCRIPTION

Exemplary embodiments described herein include systems, methods, and processing nodes for dynamically selecting a number of transmitting ports in an antenna at an access node. Severe weather (such as rain, snow, etc.), building, trees and other obstacles in the path of wireless signal transmission, and switching from a lower frequency to a higher frequency or vice versa, can cause further signal attenuation in addition to the attenuation caused by transmission over a free space distance. As a result, the levels of signals received at the wireless devices may be reduced. To compensate for the signal attenuation, the disclosed systems and methods enable dynamic selection of a number of transmitting ports in an antenna at an access node. When two or more transmitting ports are used for transmitting the same information, data, or signal with different encoding (e.g., when transmission diversity is used), the reliability and quality of the signals received at the wireless devices may be improved. Different numbers of transmitting ports may be selected for transmitting data to compensate for different levels of signal attenuation. When the signal attenuation becomes more severe (e.g., when the reductions in the levels of signals received at the wireless devices are increased), more transmitting ports of an antenna may be selected for transmitting data, which increases the data transmission diversity. When the signal attenuation is improved (e.g., when the reductions in the levels of signals received at the wireless devices are reduced), fewer transmitting ports may be selected for transmitting data, which reduces the data transmission diversity. When fewer antenna ports are selected for data transmission, the ports may be turned off, thereby saving energy at the antenna.

Dynamic selection of antenna ports for data transmission to compensate for signal attenuation may be implemented when two or more antenna ports are available in an antenna, for example, when FD MIMO is used in the antenna. In FD MIMO, an array of antenna elements is included in the antenna. The array may include N by M of antenna elements, where N is a positive integer number representing the number of rows and M is a positive integer number representing the number of columns. For example, N by M may be 8×8, 16×16, 64×64, etc. N and M may or may not be the same. In some embodiments, each of N and M may be greater than or equal to 1, e.g., greater than or equal to 2. For example, N and M may be any positive integer ranging from 2 to 64. With the disclosed systems and methods, not only the number of transmitting ports can be dynamically selected, the combination of antenna elements can be dynamically selected. For example, the array of antenna elements may be assigned into different groups of antenna elements. A first group of antenna elements may be selected for transmitting data toward a first area within the coverage area of the access node, and a second group of array elements may be selected for transmitting data toward a second area within the coverage area.

The term "port" refers to an antenna port. The port may be a physical port or may be a virtual, logical port. A port may be associated with one or more than one antenna element. For illustrative purposes, in this discussion, a port may be associated with one antenna element. The term "transmitting port" refers to an antenna port that is used for transmitting data by the antenna. It is understood that one or more ports of an antenna may be used for receiving data. In some embodiments, the transmitting ports may also be used for receiving data.

An exemplary system described herein includes at least an access node, such as an eNodeB, and a plurality of end-user wireless devices. The system may also include a relay node in wireless communication with the access node and configured to relay data packets between the access node and an end-user wireless device served by the relay node. The term "end-user wireless devices" or "wireless devices" used herein includes both end-user wireless devices that are directly communicating with the access node, and end-user wireless devices that are indirectly communicating with the access node through the relay node.

Relay nodes may improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

In some embodiments, a relay node may include a first component for communicating with the donor access node via a wireless backhaul connection and a second component for deploying a wireless air interface. End-user wireless devices can attach to the wireless air interface deployed by the relay node to access network services provided by the donor access node. For example, the first component may include a wireless device for communicating with the donor access node via the backhaul (hereinafter, the first component may be referred to as "relay wireless device" or "relay user equipment" or "Relay UE"). The second component may include a small-cell access node (hereinafter the second component may be referred to as "relay access point"), which may communicate with end-user wireless devices that rely on the relay node for communicating with the donor access node. Alternatively, the first and second components may be combined into a single relay node device.

In addition to the systems and methods described herein, the operations for dynamically selecting the number of transmitting ports for an antenna at the access node may be implemented as computer-readable instructions or methods, and processing nodes on the network for executing the instructions or methods. The processing node may include a processor included in the access node or a processor included in any controller node in the wireless network that is coupled to the access node.

Figure 1:
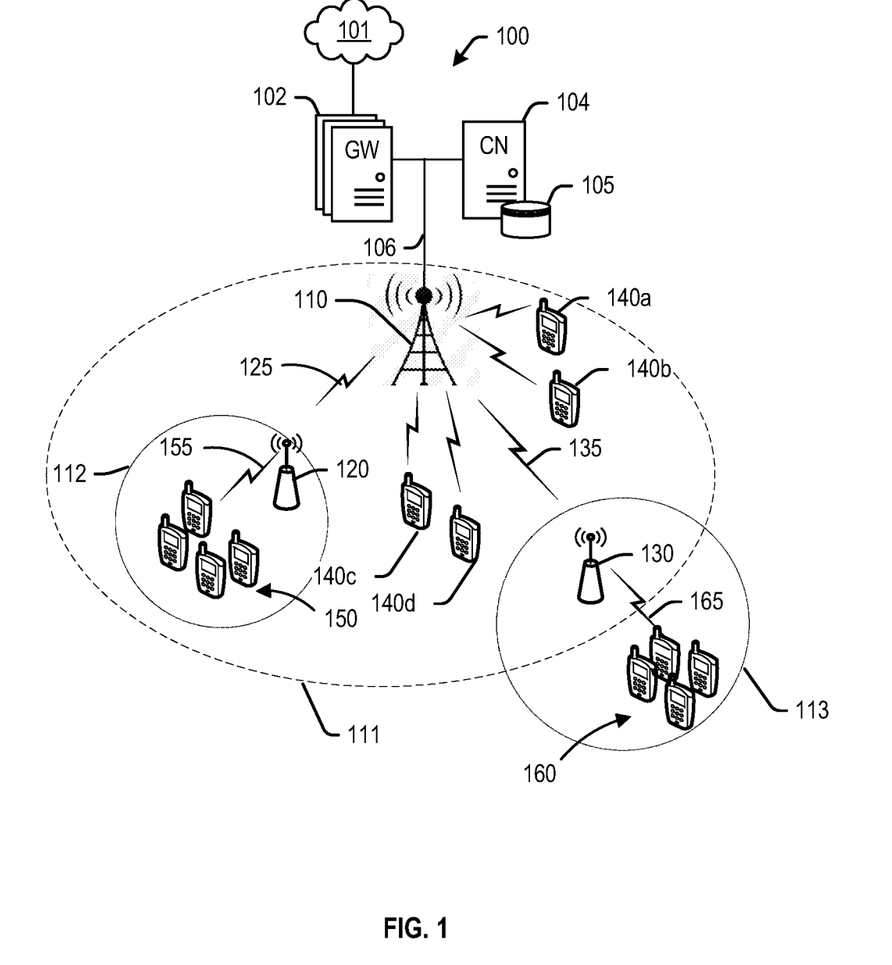
FIG. 1 depicts an exemplary system for wireless communication, in accordance with the disclosed embodiments.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a first radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. Hereinafter, for simplicity, the directly connected and indirectly connected end-user wireless devices are generally referred to as end-user wireless devices or wireless devices.

In the exemplary embodiment shown in FIG. 1, access node 110 may be a macro-cell access node configured to deploy a wireless radio air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Wireless links 125 and 135, as well as other wireless links that directly couple wireless devices 140a, 140b, 140c, and 140d with access node 110, as shown in FIG. 1, form the wireless network (or wireless radio air interface) deployed by access node 110 within coverage area 111. Relay nodes 120 130 may be further configured to deploy additional wireless radio air interfaces over coverage areas 112 and 113, respectively. A plurality of wireless devices 150 may be configured to attach to a wireless radio air interface or link 155 deployed by relay node 120, and a plurality of wireless devices 160 may be configured to attach to a wireless air interface or link 165 deployed by relay node 130. All of the wireless devices 150 and 160 are indirectly attached to the wireless radio air interface deployed by access node 110 through relay nodes 120 and 130.

In some embodiments, wireless devices 150 and 160 may access network services using the combination of relay nodes 120 and 130, wireless backhaul links 125 and 135, and access node 110. In some embodiments, wireless devices 140a, 140b, 140c, and 140d may access network services by directly connecting to access node 110. As shown in FIG. 1, wireless devices 160 are illustrated as being located outside of coverage area 111 of access node 110. Wireless devices 160 may access network services provided by access node 110 through relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations such as those described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

Wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. Wireless devices 140a, 140b, 140c, and 140d may be directly communicating with access node 110 without using a relay node, whereas wireless devices 150 and 160 may be indirectly communicating with access node using relay nodes 120 and 130. Each of wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by wireless devices 150 and 160. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5GNR, or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G Next Radio (5G NR), and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein, including operations relating to dynamically selecting the number of transmitting ports in an antenna at access node 110. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
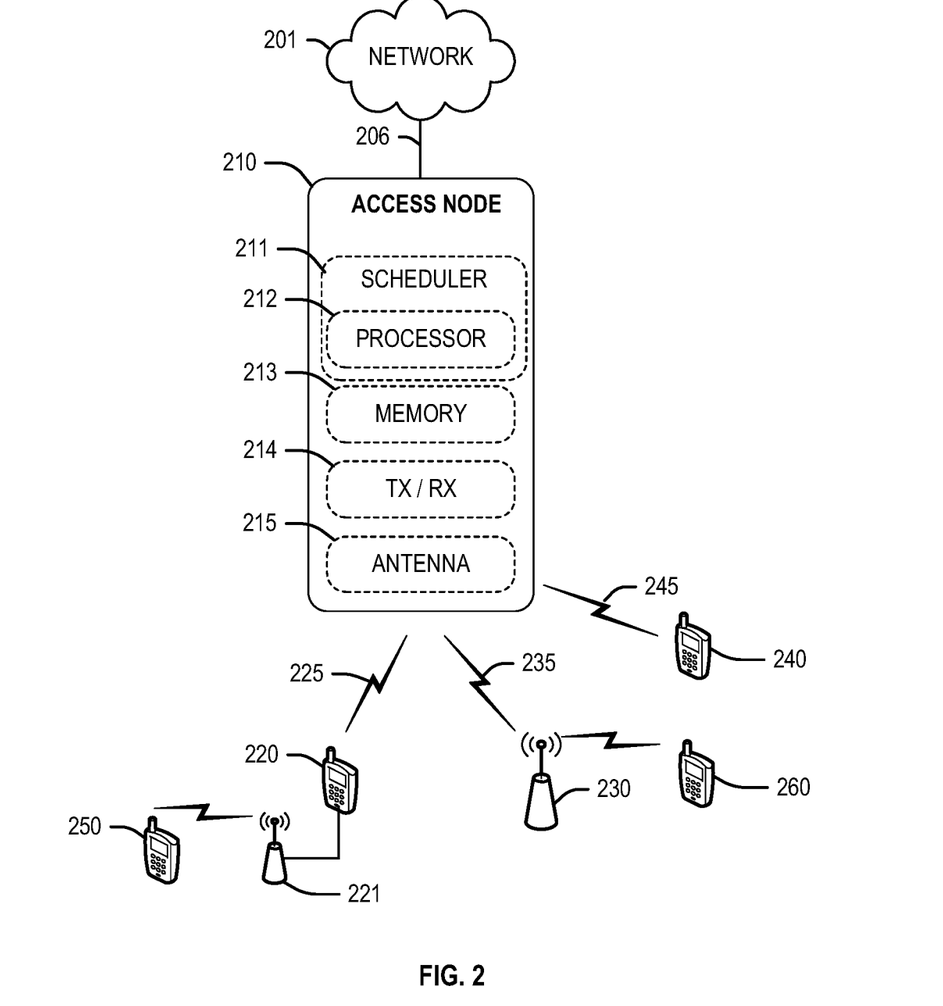
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including uplink resources, for relay nodes communicatively coupled to access node 210. In some embodiments, processor 212 of scheduler 211 may be configured to execute instructions stored on memory 213 for performing various methods disclosed herein for dynamically selecting the number of transmitting ports for an antenna at access node 210. Transceiver 214 and antenna 215 may be configured to enable wireless communication with a relay wireless device 220, a relay node 230, and an end-user wireless device 240. Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210.

Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210. Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
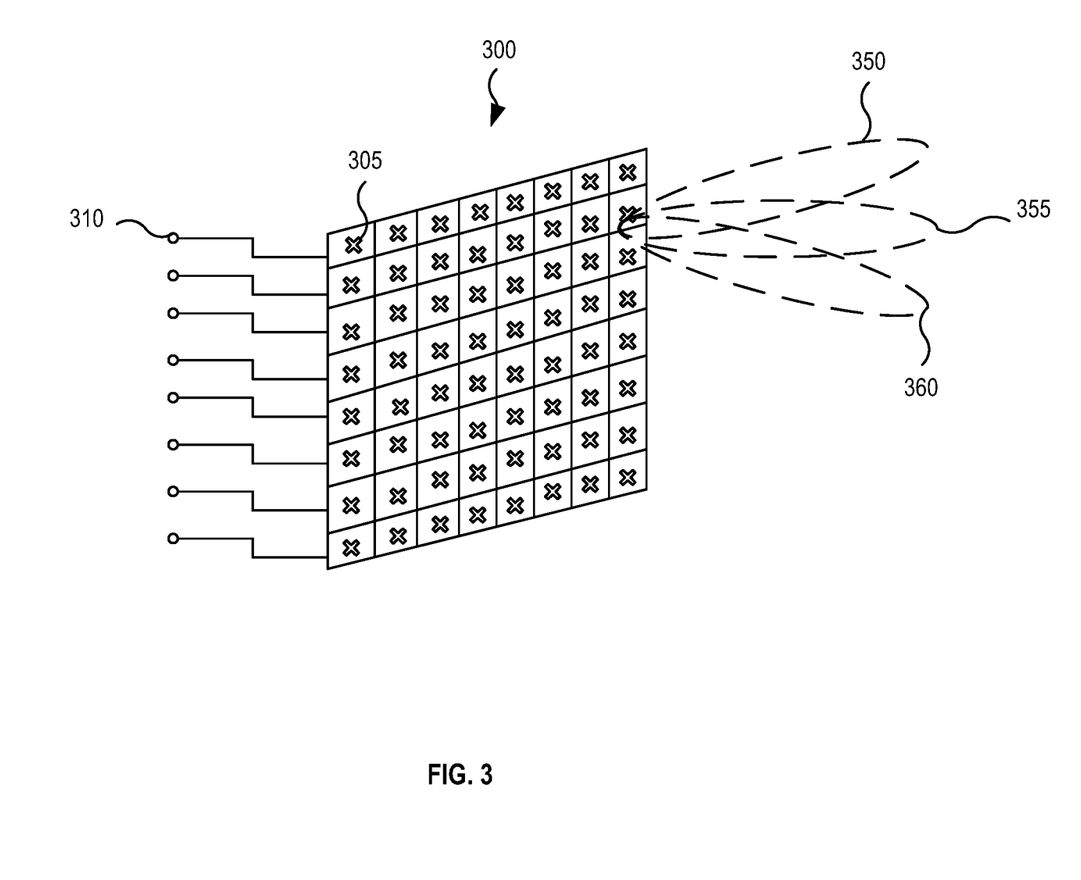
FIG. 3 depicts an exemplary antenna that can be used at an access node, in accordance with the disclosed embodiments.

FIG. 3 depicts an exemplary full dimension multi-input-multi-output (FD MIMO) antenna 300, in accordance with the disclosed embodiments. The FD MIMO antenna 300 may be used at access node 110 or 210 for implementing the wireless radio air interface over the coverage area 111. For example, antenna 300 may be an embodiment of antenna 215. Antenna 300 may include an array of antenna elements 305 arranged on a plane, such as a metal plate. Each antenna element 305 may include one or more than one sub-element. The array may include N×M antenna elements, where N and M may be positive integer numbers, such as any of 1, 2, 3, 4, 5, . . . 64, 65, 66, etc. Antenna elements 305 may be grouped and configured (e.g., orientated) such that each group of antenna elements 305 may be associated with one or more coverage portions 350, 355, and 360 illustrated in FIG. 3. Antenna 300 may include a plurality of antenna ports 310. Each port 310 may be associated with one or more antenna element 305. For simplicity, not all antenna ports 310 are shown in FIG. 3.

According to the present disclosure, the number of antenna ports may be dynamically selected for transmitting data to compensate for the dynamically changing signal attenuation due to, e.g., weather, building, trees, and other obstacles in the transmission path. In other words, the level of transmission diversity may be dynamically adjusted by selecting different number of transmitting ports depending on the condition of signal attenuation. For example, when there is rain or snow, the signal transmitted from the access node to the wireless devices may experience more attenuation. When wireless devices move from one place to another and the landscape changes (e.g., buildings, trees, etc.), the signal attenuation may change. As a further example, when wireless devices move from a 4G coverage zone into a 5G coverage zone, the signal attenuation experienced by the wireless devices may change due to the sudden increase in the carrier frequency. Thus, the signal attenuation experienced by the wireless devices may change dynamically. Accordingly, the number of transmitting ports of antenna 300 may also be dynamically changed or selected to compensate for the changing signal attenuation.

Figure 4:
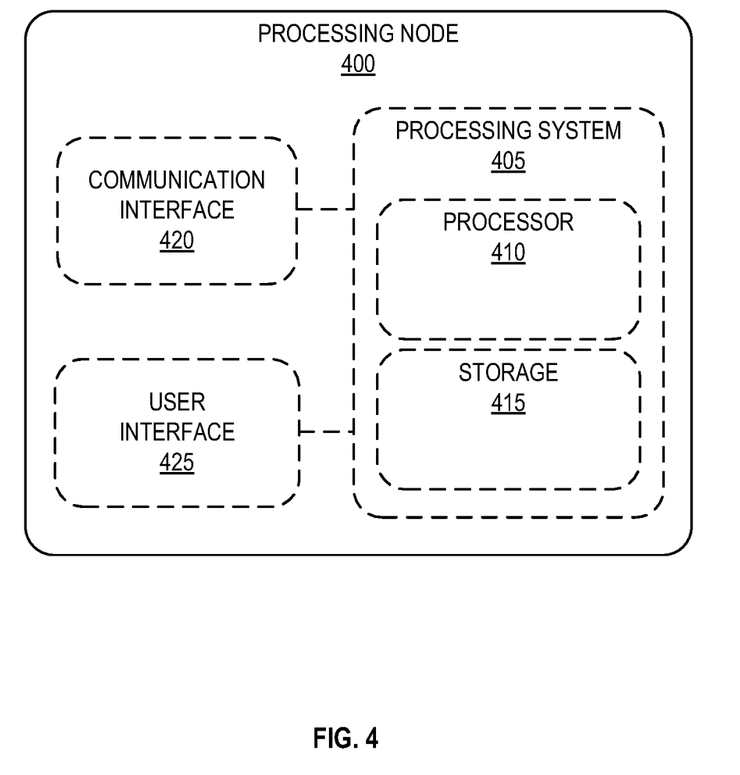
FIG. 4 depicts an exemplary processing node, in accordance with the disclosed embodiments.

FIG. 4 depicts an exemplary processing node 400, which may be configured to perform the methods and operations disclosed herein for dynamically selecting the number of transmitting ports for an antenna at an access node. In some embodiments, processing node 400 may be included in an access node, such as access node 110 or 210. In some embodiments, processing node 400 may be included in controller node 104, and may be configured for controlling the access nodes, including dynamically selecting the number of transmitting ports for the antenna at the access nodes.

Processing node 400 may be configured for dynamically selecting the number of transmitting ports for antenna 300 at an access node. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

Figure 5:
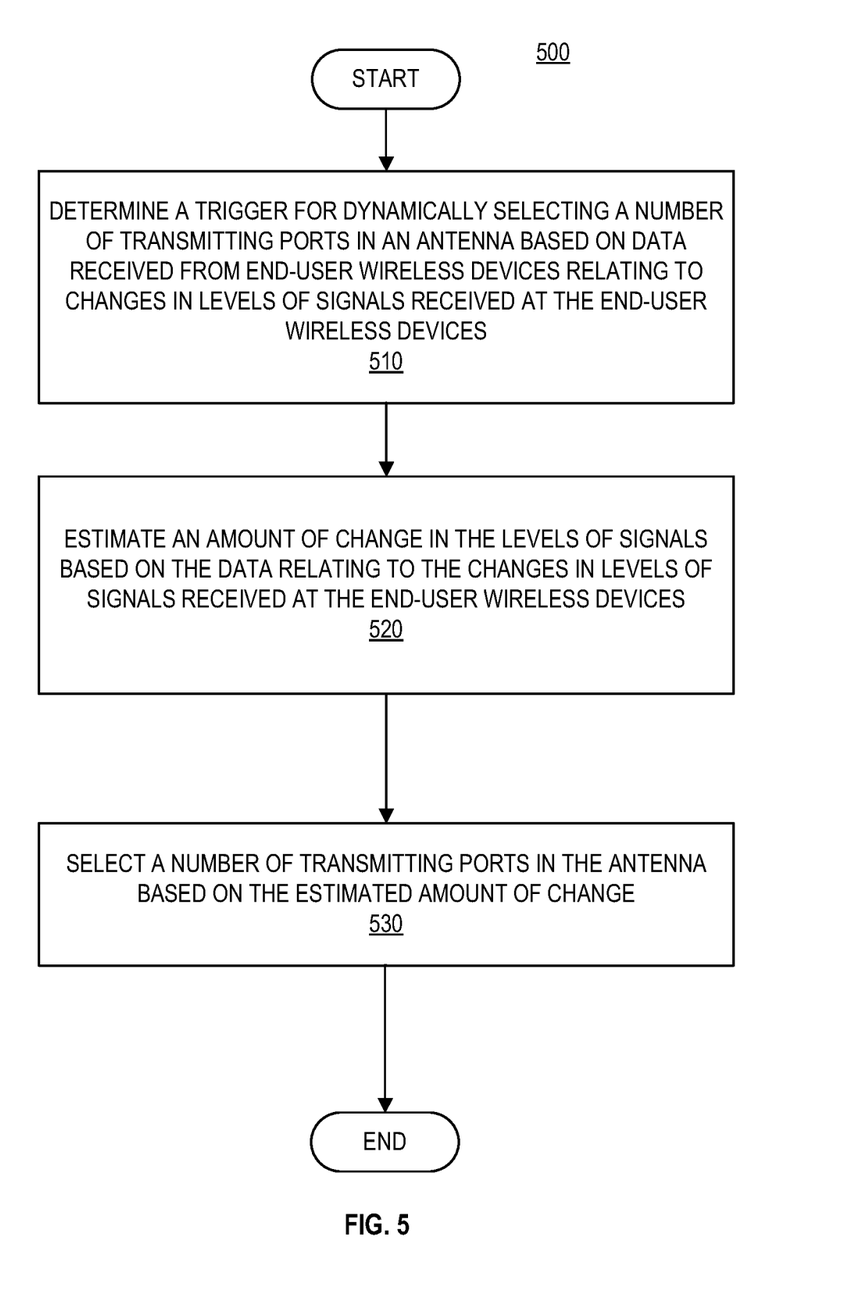
FIG. 5 depicts an exemplary method for dynamically selecting a number of transmitting ports in an antenna at an access node, in accordance with the disclosed embodiments.

The disclosed methods for dynamically selecting the number of transmitting ports for an antenna at an access node are discussed further below. FIG. 5 illustrates an exemplary method for dynamically selecting the number of transmitting ports for an antenna at an access node, such as access node 110 or 210. Method 500 may be performed by any suitable processor discussed herein, for example, a processor included in access node 110 or 210, processor 410 included in processing node 400, or a processor included in controller node 104. For discussion purposes, as an example, method 500 is described as being performed by a processor included in access node 110.

Method 500 may include determining a trigger for dynamically selecting a number of transmitting ports in the antenna based on data received from the end-user wireless devices relating to changes in levels of signals received at the end-user wireless devices (step 510). Wireless devices may periodically report operational status, including the levels of signals received at the wireless devices, to access node 110. The period for regular reporting may be any suitable predetermined time period, such as, for example, 100 ms, 200 ms, 1 second, 3 seconds, 1 minute, 3 minutes, 1 hours, 2 hours, etc. The report may be in a form of a message that includes data indicating the level of signal received at a wireless device. When the level of signal received at the wireless device drops, access node 110 may determine that the wireless device has experienced a certain level of signal attenuation. The changes in the levels of signals may be reductions in the levels of signals received at the wireless devices. The reductions in the levels of signals may be caused by weather (e.g., rain, snow, clouds, etc.), buildings, trees, or other obstacles in the transmission path of the signals from access node 110 to the wireless devices. A reference point for determining the change (e.g., reduction) in the level of signal received may be a level of signal received when the signal is transmitted at a free open space without the interference from, for example, rain, snow, building, trees, etc. Any other suitable reference point may be used as well.

In some embodiments, determining the trigger may include determining that a predetermined number of end-user wireless devices have reported reductions in the levels of signals received at the predetermined number of end-user wireless devices, the reductions being greater than a predetermined threshold reduction. For example, wireless devices (e.g., 140a-140d) may periodically send messages to access node 110, reporting the operational status of the wireless devices. The messages may include information or data indicating the level or strength of signal received at the wireless devices. Thus, when a wireless device experiences a signal loss (e.g., a reduction in the level of the signal received at the wireless device), the wireless device may report the occurrence and the magnitude of the signal loss to access node 110. For example, the magnitude of signal loss (e.g., reduction in the level of signal received) may be 2 dB, 3 dB, etc. Access node 110 may pre-set one or more predetermined threshold reduction values, e.g., 3 dB, 6 dB, 11 dB, 15 dB, etc. Access node 110 may compare the signal loss reported by the wireless devices with one or more predetermined threshold reduction values to determine whether the signal loss is greater than the one of the predetermined threshold reduction values. Access node 110 may also pre-set a predetermined number, e.g., 10, 15, 20, or any other suitable number, for the wireless devices. Access node 110 may determine whether more than a predetermined number of wireless devices have reported a signal loss of greater than one of the predetermined threshold reduction values. Thus, in one embodiment, the trigger may be when more than the predetermined number of wireless devices have reported a signal loss of greater than one of the predetermined threshold reduction values. The wireless devices reporting the signal loss may be located within or adjacent coverage area 111. In some embodiments, the wireless devices reporting the signal loss may be located anywhere within coverage area 111, or may be limited to a specified portion of coverage area 111. For example, the trigger may be that 10 wireless devices within coverage area 111 have reported to access node 110 a signal loss of greater than 2 dB.

In some embodiments, determining the trigger may include determining that a predetermined number of end-user wireless devices have reported reductions in the levels of signals received at the predetermined number of end-user wireless devices, the reductions being within a predetermined threshold reduction range, e.g., 2 dB-3 dB, 4 dB-6 dB, 7 dB-11 dB, 12 dB-15 dB, etc. For example, in some embodiments, the trigger may be that 10 wireless devices have reported to access node 110 a signal loss that is within the range of 2 dB to 3 dB, or 4 dB-6 dB, etc.

In some embodiments, the changes in the levels of signals received at the wireless devices may be changes in the path loss. Path loss indicates the radio frequency coverage distance of a wireless network. The path loss is proportional to the square of the carrier frequency. Thus, the path loss may be changed when the frequency changes. In some embodiments, the change in path loss may be an abrupt, sudden change. For example, when a wireless device moves from a portion of coverage area 111 that supports 4G wireless communications (which use lower frequencies, such as 2.5 GHz) to a portion of coverage area 111 that supports 5G wireless communications (which use higher frequencies such as 28 GHz), the path loss may show a sudden change (e.g., an abrupt increase in the path loss). The change may be greater than a predetermined threshold reduction value, e.g., 2 dB, 3 dB, 4 dB, etc. In some embodiments, the change may be within a predetermined threshold reduction range, such as, e.g., 2 dB-3 dB, 4 dB-6 dB, etc.

The reductions in the levels of signals received at the wireless devices may change over time as the environment for signal transmission changes. For example, when the weather changes from heavy rain to cloudy, the levels of signals received at the wireless devices may increase, for example, from a reduction of 10 dB to a reduction of 5 dB. A different number of transmitting ports may be selected for the antenna in order to compensate for the smaller signal attenuation. In some embodiments, when the carrier frequency changes from a 5G wireless communication frequency (which is higher) to a 4G wireless communication frequency (which is lower), the path loss may also change. A different number of transmitting ports may be selected for the antenna in order to compensate for the different path loss when the frequency changes.

Referring back to FIG. 5, method 500 may include estimating an amount of change in the levels of signals based on the data relating to the changes in levels of signals received at the end-user wireless devices (step 520). For example, access node 110 may estimate an amount of change based on the changes reported by the predetermined number of wireless devices (e.g., 10 wireless devices). In some embodiments, the estimated amount of change may be an average of the changes in the levels of signals reported by the predetermined number of wireless devices. In some embodiments, the estimated amount of change may be a medium value of the changes in the level of signals reported by the predetermined number of wireless devices. For example, when 10 wireless devices have reported 10 reductions in the levels of signals received, the estimated amount of change may be an average value or a medium value of the 10 reductions. Other statistical values based on the changes reported by the predetermined number of wireless devices may also be calculated as the estimated amount of change.

Method 500 may further include selecting a number of transmitting ports in the antenna based on the estimated amount of change (step 530). For example, the estimated amount of change may be an average reduction based on the reductions reported by the predetermined number of wireless devices. The average reduction may be greater than a predetermined threshold reduction value, such as 2 dB, 4 dB, 7 dB, 12 dB, etc. The predetermined threshold reduction value may have a predetermined relationship with the number of transmitting ports to be selected. For example, when the average reduction is greater than 2 dB, 2 transmitting ports may be selected; when the average reduction is greater than 4 dB, 6 transmitting ports may be selected; when the average reduction is greater than 7 dB, 12 transmitting ports may be selected; when the average reduction is greater than 12 dB, 18 transmitting ports may be selected. In some embodiments, the selection of the number of transmitting ports may be based on a relationship between the number of transmitting ports and a predetermined threshold reduction range. For example, when the average reduction is 2.5 dB, it falls within a predetermined range of 2 dB-3 dB. According to the predetermined relationship, the range of 2 dB-3 dB may correspond to 2 transmitting ports. As another example, when the average reduction is 5 dB, it falls within a predetermined range of 4 dB-6 dB. According to the predetermined relationship, the range of 4 dB-6 dB may correspond to 6 transmitting ports. In other examples, the range of 7 dB-11 dB may correspond to 12 transmitting ports, and the range of 12 dB-15 dB may correspond to 18 transmitting ports. It is noted that the ranges are approximate ranges. For example, the range of 2 dB-3 dB may be modified as 1.9 dB-3.5 dB or other suitable ranges.

A predetermined relationship between the number of transmitting ports to be selected (n) and the reduction (P) in the levels of signals received at the wireless devices may be approximately determined based on: $P=10 \log(n)+Q$, where Q may be an adjustment value that may be a constant value or dependent on the number of transmitting ports n. Based on this approximate relationship, one can set the predetermined relationship between the number of transmitting ports and the predetermined threshold reduction ranges. For example, when the number of transmitting ports is 2 (i.e., n=2), the range may be set as 2 dB-3 dB. When the number of transmitting ports is 6, the range may be set as 4 dB-6 dB. When the number of transmitting ports is 12, the range may be set as 7 dB-11 dB. When the number of transmitting ports is 18, the range may be set as 12 dB-15 dB. The relationships for other number (e.g., n=5, 10, 20, 32, 64, etc.) of transmitting ports and other ranges may be similarly determined. The predetermined relationships may be saved as a table in a database.

Based on the estimated amount of change in the levels of signals received at the wireless devices and the predetermined relationship between the number of transmitting ports and the ranges, the number of transmitting ports may be selected for transmitting data. Thus, for different levels of signal attenuation, different number of transmitting ports may be selected. As the levels of signal reductions change over time, the number of transmitting ports may be dynamically selected. In other words, the level of transmitting diversity may be adjusted dynamically as the signal attenuation changes over time. For example, when signal attenuation is large due to heavy rain, more transmitting ports may be selected for data transmission, thereby increasing the level of transmitting diversity to compensate for the large signal attenuation. When the weather turns sunshine and the signal attenuation is small, fewer transmitting ports may be selected, thereby reducing the level of transmitting diversity to compensate for the small signal attenuation. When fewer transmitting ports are selected, energy can be saved at the antenna turning off some of the transmitting ports.

Method 500 may include other steps or operations. For example, after the number of transmitting ports are selected, access node 110 may use the selected number of transmitting ports to transmit data to the wireless devices. In the array of antenna elements shown in FIG. 3, there may be various combinations of antenna elements or ports that can be selected for the determined number. Various groups of antenna elements may be configured for transmitting data in various directions or portions of coverage area 111. Thus, depending on the distribution of the wireless devices that have reported the changes in the levels of signals received at the wireless devices, the selection of specific antenna elements (and hence ports) may be different. Various antenna elements (and hence ports) may be selected to form a combination that may effectively compensate for different levels of signal attenuation experienced by the wireless devices.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for dynamically changing a number of transmitting ports in an antenna at an access node, the system comprising:
   an access node configured to deploy a first radio air interface to provide wireless services to a plurality of end-user wireless devices, the access node comprising:
      an antenna having a plurality of ports and configured to communicate data with the plurality of end-user wireless devices through the ports and the first radio air interface; and
      a processor configured to:
         receive data from the plurality of end-user wireless devices relating to changes in levels of signals received at the end user devices from the access node using a first number of transmitting ports of the plurality of ports in the antenna;
         determine a trigger for dynamically selecting a number of transmitting ports of the plurality of ports in the antenna based on the data received from the plurality of end-user wireless devices relating to changes in levels of signals received at the end-user wireless devices;
         estimate an amount and direction of change in the levels of signals based on the data relating to the changes in levels of signals received at the plurality of end-user wireless devices;
         select a second number of transmitting ports of the plurality of ports in the antenna based on the estimated amount and direction of change, the second number differing from the first number, the second number being greater than the first number when the direction of change is an increase in signal attenuation, and being less than the first number when the direction of change is a decrease in signal attenuation; and
transmit data using the second number of transmitting ports of the antenna.

2. The system of claim 1, wherein determining the trigger includes determining that a predetermined number of end-user wireless devices have reported reductions in the levels of signals received at the predetermined number of end-user wireless devices, the reductions being greater than a predetermined threshold reduction value.

3. The system of claim 1, wherein determining the trigger includes determining that a predetermined number of end-user wireless devices have reported reductions in the levels of signals received at the predetermined number of end-user wireless devices, the reductions being within one of a predetermined threshold reduction range.

4. The system of claim 1, wherein determining the trigger includes determining that a predetermined number of end-user wireless devices have reported changes in a path loss, the changes being greater than a predetermined threshold reduction value.

5. The system of claim 1, wherein determining the trigger includes determining that a predetermined number of end-user wireless devices have reported changes in a path loss, the changes being within one of a predetermined threshold reduction range.

6. The system of claim 1, wherein estimating the amount of change in the levels of signals includes calculating at least one of an average value and a median value based on the changes in the levels of signals received at the plurality of end-user wireless devices.

7. The system of claim 1, wherein the antenna includes an array of antenna elements and a plurality of ports including the transmitting ports, each of the plurality of ports corresponding to one or more of the antenna elements.

8. The system of claim 7, wherein the array includes N by M antenna elements, where N and M are positive integers ranging from 2 to 64.

9. A method for dynamically changing a number of transmitting ports in an antenna at an access node, the method comprising:
receiving data at the access node from a plurality of end-user wireless devices relating to changes in levels of signals received at the plurality of end user devices from the access node using a first number of transmitting ports of the plurality of ports in the antenna;
determining a trigger for dynamically selecting a number of transmitting ports of the plurality of ports in the antenna based on the data received from the plurality of end-user wireless devices relating to changes in levels of signals received at the plurality of end-user wireless devices;
estimating an amount and direction of change in the levels of signals based on the data relating to the changes in levels of signals received at the plurality of end-user wireless devices;
selecting a second number of transmitting ports of the plurality of ports in the antenna based on the estimated amount and direction of change, the second number differing from the first number, the second number being greater than the first number when the direction of change is an increase in signal attenuation, and being less than the first number when the direction of change is a decrease in signal attenuation; and
transmitting data using the second number of transmitting ports of the antenna.

10. The method of claim 9, determining the trigger includes determining that a predetermined number of end-user wireless devices have reported reductions in the levels of signals received at the predetermined number of end-user wireless devices, the reductions being greater than a predetermined threshold reduction value.

11. The method of claim 9, wherein determining the trigger includes determining that a predetermined number of end-user wireless devices have reported reductions in the levels of signals received at the predetermined number of end-user wireless devices, the reductions being within a predetermined threshold reduction range.

12. The method of claim 9, wherein determining the trigger includes determining that a predetermined number of end-user wireless devices have reported changes in a path loss, the changes being greater than a predetermined threshold reduction value.

13. The method of claim 9, wherein determining the trigger includes determining that a predetermined number of end-user wireless devices have reported changes in a path loss, the changes being within a predetermined threshold reduction range.

14. The method of claim 9, wherein estimating the amount of change in the levels of signals includes calculating at least one of an average value and a median value based on the changes in the levels of signals received at the plurality of end-user wireless devices.

15. The method of claim 9, wherein the antenna includes an array of antenna elements and a plurality of ports including the transmitting ports, each of the plurality of ports corresponding to one or more of the antenna elements.

16. The method of claim 15, wherein the array includes N by M antenna elements, where N and M are positive integers ranging from 2 to 64.

17. A processing node for dynamically changing a number of transmitting ports in an antenna at an access node, the processing node being configured to perform operations comprising:
receiving data at the access node from a plurality of end-user wireless devices relating to changes in levels of signals received at the end user devices from the access node using a first number of transmitting ports of the plurality of ports in the antenna;
determining a trigger for dynamically selecting a number of transmitting ports of the plurality of ports in the antenna based on the data received from the plurality of end-user wireless devices relating to changes in levels of signals received at the plurality of end-user wireless devices;
estimating an amount and direction of change in the levels of signals based on the data relating to the changes in levels of signals received at the plurality of end-user wireless devices;
selecting a second number of transmitting ports of the plurality of ports in the antenna based on the estimated amount and direction of change, the second number differing from the first number, the second number being greater than the first number when the direction of change is an increase in signal attenuation, and being less than the first number when the direction of change is a decrease in signal attenuation; and
transmitting data using the second number of transmitting ports of the antenna.

18. The processing node of claim 17, wherein determining the trigger includes determining that a predetermined number of end-user wireless devices have reported reductions in the levels of signals received at the predetermined number of end-user wireless devices, the reductions being within a predetermined threshold reduction range.

19. The processing node of claim 17, wherein determining the trigger includes determining that a predetermined number of end-user wireless devices have reported reductions in the levels of signals received at the predetermined number of end-user wireless devices, the reductions being greater than a predetermined threshold reduction value.

20. The processing node of claim 17, wherein determining the trigger includes determining that a predetermined number of end-user wireless devices have reported changes in a path loss, the changes being within a predetermined threshold reduction range.

\* \* \* \* \*